United States Patent [19]
Wright et al.

[11] 3,759,591
[45] Sept. 18, 1973

[54] CENTRIFUGE SEAL ASSEMBLY AND METHOD

[75] Inventors: Hersche E. Wright, Santa Clara, William J. Cassingham, Campbell, both of Calif.

[73] Assignee: Beckman Instruments, Inc., Fullerton, Calif.

[22] Filed: Aug. 30, 1971

[21] Appl. No.: 176,028

[52] U.S. Cl. .............................................. 308/189 R
[51] Int. Cl. ........................................... F16c 33/72
[58] Field of Search ................. 285/134; 308/189 A, 308/189 R; 277/70

[56] References Cited
UNITED STATES PATENTS
1,881,750  10/1932  Llewellyn .................... 308/189 A
3,057,646  10/1962  Brumagini ..................... 285/134
3,061,337  10/1962  Shaw et al. .................... 285/134
3,443,747  5/1969  Jacobson et al. ................... 285/135

*Primary Examiner*—Charles J. Myhre
*Assistant Examiner*—Barry Grossman
*Attorney*—Flehr, Hohbach, Test, Albritton & Herbert

[57] ABSTRACT

Face type centrifuge sealing assembly having a pair of preloaded anti-friction bearings between the rotating and stationary portions thereof. The inner races of the bearings are secured to the centrifuge rotor, and the outer races are urged apart, or preloaded, by a resilient member disposed between them. In the preferred method of assembly, the outer races are secured to the stationary portion of the centrifuge after they are preloaded.

5 Claims, 2 Drawing Figures

INVENTORS
Herschel E. Wright
BY William J. Cassingham
Attorneys

CENTRIFUGE SEAL ASSEMBLY AND METHOD

BACKGROUND OF THE INVENTION

This invention pertains generally to centrifuges and more particularly to a centrifuge seal assembly and method for assembling the same.

The invention is particularly suited for use with centrifuges of the type having a rotor which is loaded and unloaded from the top. Fluid connections are commonly made between the rotating and stationary portions of such centrifuges by means of rotary face seals. The faces of these seals must be accurately aligned to prevent fluid leakage and undue wearing of the seals.

In seal assemblies heretofore provided, the stationary and rotating portions of the centrifuges are commonly separated by a single bushing or anti-friction bearing. With a single bearing or bushing, it is difficult to align the seal faces accurately, and these seals tend to leak and to wear rapidly. When bushings are used, it is usually necessary to provide external lubricating and cooling systems to assure proper operation of the bushings. In some bearing systems of the prior art, the outer race of the bearing can move relative to its housing, resulting in wear of the housing and serious misalignment unless the housing is fabricated of a hard material.

SUMMARY AND OBJECTS OF THE INVENTION

In the seal assembly of the invention, a pair of anti-friction bearings is provided between the rotating and stationary portions of the centrifuge. A resilient member is disposed between the outer races of the bearings and serves to preload them. During assembly, the bearings and resilient member are placed on the rotor, and the inner races of the bearings are drawn together and secured in a predetermined position on the rotor, with the resilient member urging the outer races apart. After the bearings have thusly been preloaded, the outer races are secured to the stationary portion of the assembly, and the face seals are installed.

It is in general an object of the present invention to provide a new and improved centrifuge seal assembly and method for assembling the same.

Another object of the invention is to provide a seal assembly of the above character which includes a pair of spaced apart preloaded anti-friction bearings.

Additional objects and features of the invention will be apparent from the following description in which the preferred embodiments are set forth in detail in conjunction with the accompanying drawings.

DESCRIPTION OF THE PREFERRED EMBODIMENTS

Figure 1:
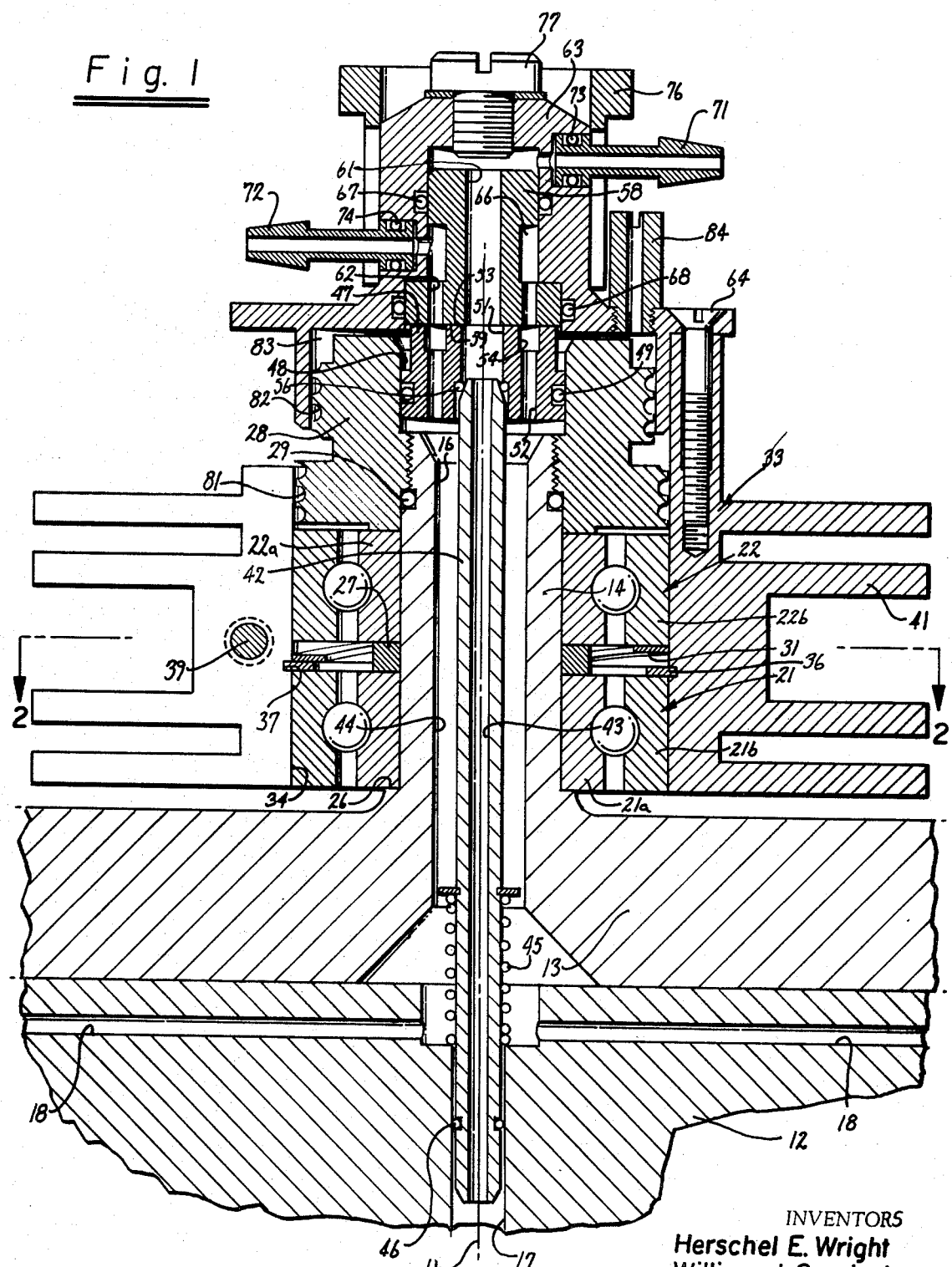
FIG. 1 is a sectional elevation of one embodiment of a seal assembly incorporating the present invention.

This invention is illustrated in connection with a centrifuge having a rotor assembly 10 adapted for rotation about a vertical axis 11. The rotor assembly includes a core or body 12 and a cover 13 having an axially extending portion 14. An axially extending bore 16 in the cover 13 and extension 14 communicates with an axially extending flow passage 17 and a plurality of radially extending flow passages 18 in the core 12. The cover is secured to the body by suitable means, not shown.

The seal assembly includes a pair of anti-friction bearings 21 and 22. As illustrated, these bearings are of the ball type, having inner races 21a and 22a and outer races 21b and 22b, respectively. These bearings are mounted on the extension 14, with the inner race of the bearing 21 abutting against an annular shoulder 26 on the extension. A spacer 27 is provided between inner races of the bearings, and a seal mounting member 28 engages the upper surface of the inner race of the bearing 22. This member is threadedly mounted on the upper portion of the rotor extension and provides means for locking the inner races of the bearings in a predetermined position on the extension. An O-ring 29 provides a fluid-tight seal between the member 28 and the extension.

Means is provided for preloading the outer races of the bearings. This means includes a resilient spring washer 31 which is disposed between the outer races of the bearings and urges them apart.

Figure 2:
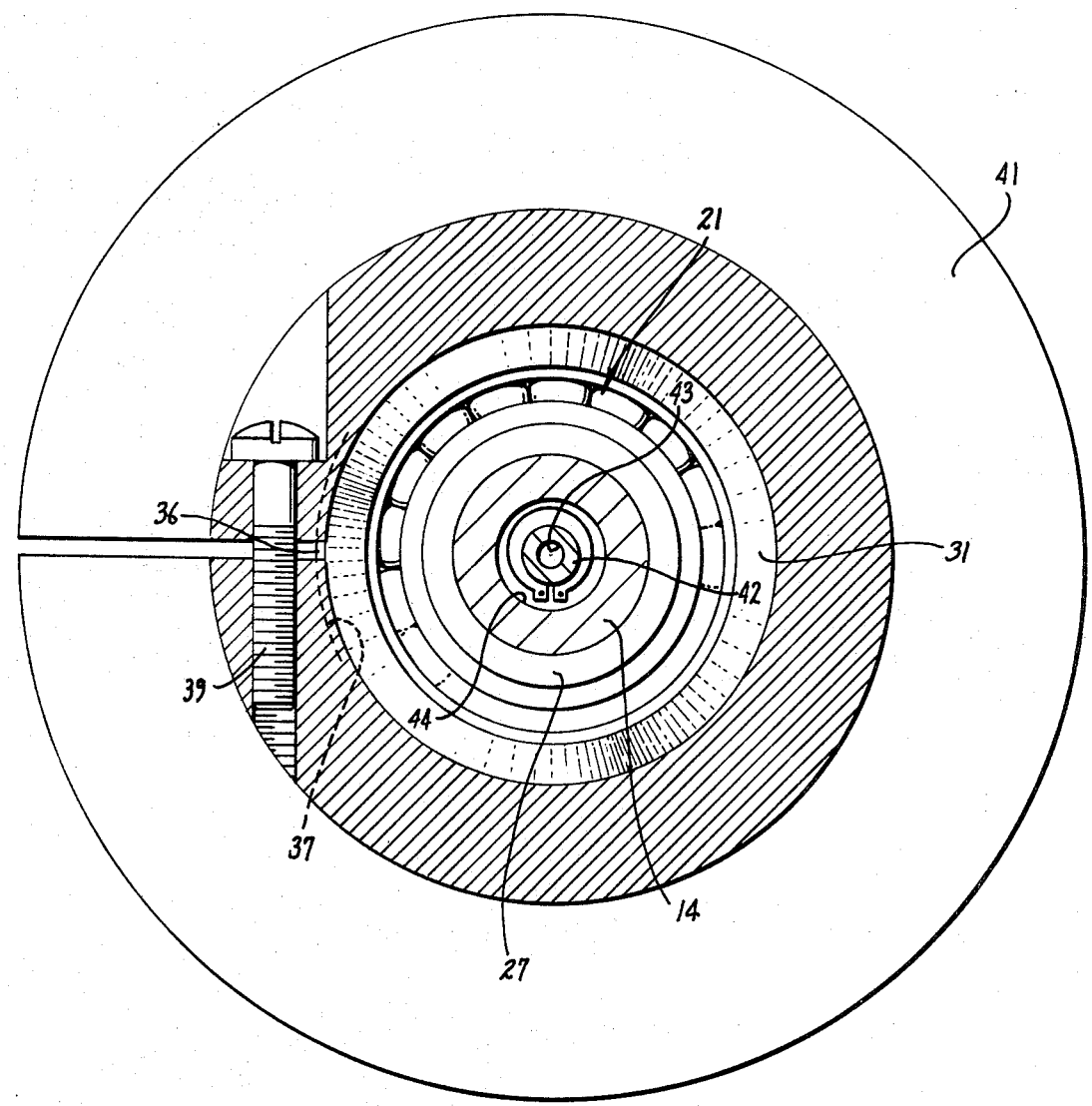
FIG. 2 is a cross-sectional view taken along line 2—2 in FIG. 1.

A stationary sleeve 33 is mounted over the bearings 21 and 22. This sleeve includes an axially extending internal bore 34 having a diameter on the same order as the outside diameter of the outer races. A snap-ring 36 is mounted in an annular recess 37 which is formed in the bore 34. This ring extends between the spring washer 31 and the outer race of the bearing 21. As can best be seen in FIG. 2, the sleeve 33 is split along a radial plane 38, and a draw bolt 39 is provided for clamping the sleeve securely to the outer races of the bearings. The sleeve includes a plurality of cooling fins 41 which provide means for transferring heat away from the bearings. Alternatively, if desired, the sleeve can be secured to the bearings by other suitable means such as set screws, cam action clips or draw type colleting.

An axially extending transfer tube 42 is mounted in the bore 16 of the rotor extension. This tube has an inner flow passage 43 which communicates with the flow passage 17 in the rotor core. An annular flow passage 44 is formed between the outer wall of the tube and the wall of the flow passage 16. This annular flow passage communicates with the flow passages 18 in the rotor core. A compression spring 45 urges the transfer tube in an upward direction, and an O-ring 46 provides a seal between the tube and the wall of the flow passage 17.

A rotating seal member 47 is mounted in an axially extending bore 48 in the seal mounting member 28. An O-ring 49 provides a static seal between the seal member and the mounting member. The seal member includes an inner flow passage 51, a plurality of outer flow passages 52, and an upper sealing face 53. The inner flow passage 51 communicates with the flow passage 43, and the outer flow passages 52 communicate with the annular flow passage 44. An annular recess 54 formed in the sealing face 53 communicates with the outer flow passage 52. The upper portion of the transfer tube 42 extends into the lower portion of the inner flow passage 51, and sealing means 56 provides a seal between the wall of this flow passage and the outer wall of the transfer tube.

A stationary seal member 58 is mounted above the rotating seal member. The stationary seal member includes a lower sealing face 59 which engages the face 53 of the rotating seal member, an inner flow passage 61 which communicates with the flow passage 51, and a plurality of outer flow passages 62 which communicate with the annular recess 54 and flow passages 52.

The stationary seal member 58 is mounted in a housing 63 which is secured to the stationary sleeve 33 by means of bolts 64. An annular flow region 66 is formed between the seal member 58 and housing 63 and communicates with the flow passages 62. O-ring seals 67 and 68 are provided between the seal member and housing above and below this region. Fittings 71 and 72 provide communication with the flow passage 61 and flow region 66. These fittings are mounted in bores in the housing 63 and sealed by O-rings 73 and 74. A slotted retaining sleeve 76 is slidably mounted over the outside of the housing 63 to retain the fittings 71 and 72 in place. Fluid lines attached to these fittings prevent the stationary housing assembly from rotating when the centrifuge is in operation. A removabe plug 77 is threadedly mounted in the top of the housing 63. This plug provides access to the upper face of the stationary seal 58 to implement the removal.

Helical grooves 81 and 82 are provided in the outer surfaces of the seal mounting member 28. When the rotor is rotating, these grooves pump any fluid in the region between the member and the sleeve 33 in an upward direction to an annular recess 83 adjacent to the sealing faces 53 and 59. A fitting 64 provides access to the region 83.

Assembly of the seal assembly and therein the method of the invention can now be described. First, the bearing 21 is placed on the rotor extension 14, with the inner race 21a abutting the shoulder 26. The stationary sleeve 33 is placed over the extension and bearing, with the snap-ring 36 resting upon the outer race 21b. The spacer and split washer 31 are placed on the inner race 21a and snap-ring 36, respectively, and the bearing 22 is then positioned on the extension. The seal mounting member 28 is then threaded onto the upper portion of the extension and tightened against the inner race 22a, thereby drawing the inner races together and securing them to the extension. As the inner races are drawn together the outer races are urged apart and preloaded by the spring washer 31. After the bearings have been preloaded, the draw bolt 39 is tightened, securing the sleeve to the outer races of the bearings.

After the bearings are preloaded and the sleeve is secured to the outer races, the transfer tube 42 is installed, and the rotating seal member 47 is placed in the bore of the seal mount 28. Thereafter the stationary seal member 58 and housing 63 are placed in position, and the screws 64 are installed. When these screws are tightened, the compression spring 45 urges the transfer tube 42 up against the seal member 47, thereby urging the sealing face 53 of this member into fluid-tight contact with the sealing face 59 of the stationary seal member 58. If not previously installed, the fittings 71, 72 and 84 are installed, and the retaining sleeve 76 is placed on the housing 63.

Fluid is brought to the centrifuge through lines attached to the fittings 71 and 72. In normal operation, fluid is introduced through the fitting 71 and passed through the flow passages 61, 51 and 43 to the flow passage 17 in the rotor core where it is manifolded according to the type of centrifugation being performed. After traveling through the rotor core, the fluid passes out through the flow passages 18, 44, 52 and 62, the annular flow region 66 and the fitting 72. If desired, the direction of flow can be reversed. As pointed out, the lines attached to the fittings 71 and 72 prevent the housing 63, sleeve 33 and parts attached thereto from rotating.

Any fluid leaking from between the sealing faces 53 and 59 passes to the annular region 83 from which it is withdrawn through the fitting 84. The helical grooves 81 and 82 prevent fluid from leaking into the bearings 21 and 22. As mentioned previously, these grooves pump any fluid between the member 28 and stationary sleeve 33 in an upward direction away from the bearings and through the fitting 84. Fluid passing through the fitting 84 can either be delivered to an outside container or allowed to collect in the centrifuge chamber.

The invention can be used for zonal centrifugation as well as continuous or semicontinuous flow operations. For zonal centrifugation the rotor can be loaded either at rest or while rotating. To reduce wear on the sealing surfaces and bearings, the fittings 71, 72 and 84 and lines attached thereto are removed after loading of the gradient is completed and before the run is made, and the normally stationary portion of the assembly is allowed to rotate with the rotor assembly. When the run is completed, the rotor is decelerated to a low speed, and the stationary housing 63, sleeve 33 and attached parts are brought to a stop, the fittings and lines are reinstalled, and the rotor is unloaded. If desired, the rotor may be brought to a complete stop prior to the reinstallation of the fittings and lines.

The invention has many desirable features. The axially preloaded anti-friction bearings permit accurate alignment of the sealing faces 53 and 59, and the stationary sealing face 59 is accurately maintained in a plane perpendicular to the axis of rotation of the rotating seal face 53. This alignment insures a good fluid-tight seal and minimizes wear between the sealing surfaces. The preloading of the bearing results in a contact angle which provides an effective support length greater than the spacing between the bearings. Since the outer races of the bearings are securely clamped to the sleeve 33, there is substantially no wearing of the sleeve even when it is fabricated of a soft material such as aluminum. The bearings do not require external lubrication or cooling, and the entire assembly is easily assembled and disassembled.

It is apparent from the foregoing that a new and improved seal assembly and method of assembling the same have been provided. While only the presently preferred embodiments have been described herein, as will be apparent to those familiar with the art, certain changes and modifications can be made without departing from the scope of the invention as defined by the following claims.

We claim:

1. In a seal assembly for a centrifuge having a rotor assembly with an axially extending portion, a rotating seal member adapted to be supported on said axially extending portion for rotation with the rotor assembly, said seal member having at least one flow passage adapted to be in communication with a flow passage in the axially extending portion, bearing means including a pair of axially spaced apart anti-friction bearings each having an inner race and an outer race, means adapted to secure the inner races of said bearings in a predetermined position on said axially extending portion of said rotor assembly, resilient means interposed between the outer races of said bearings for urging said outer races apart, a stationary housing secured to said outer races of said anti-friction bearings, and a stationary seal member carried by said stationary housing in a position above said rotating seal member, said rotating and stationary seal members having radially disposed sealing surfaces providing a fluid tight seal between said members and said stationary seal member having a flow passage communicating with the flow passage in said rotating seal member.

2. A seal assembly as in claim 1 wherein said resilient means comprises a spring washer.

3. A seal assembly as in claim 1 wherein said stationary housing includes a radially split sleeve portion surrounding the outer races of said bearings and wherein the means securing the stationary housing to the outer races includes a threaded member for clamping said sleeve portion to said races.

4. A seal assembly as in claim 1 wherein the means securing the inner races on the rotor portion includes a spacer between said races, a limiting abutment on said rotor portion engaging one of said races, and a member threadedly mounted on said rotor portion engaging the other of said races.

5. A seal assembly as in claim 4 wherein the member threadedly mounted on said rotor portion is formed to include an axially extending bore in which said rotating seal member is disposed.

* * * * *